Dec. 31, 1940. H. F. TAPP ET AL 2,227,286
LIQUID FUEL BURNER
Filed May 11, 1939 3 Sheets-Sheet 3
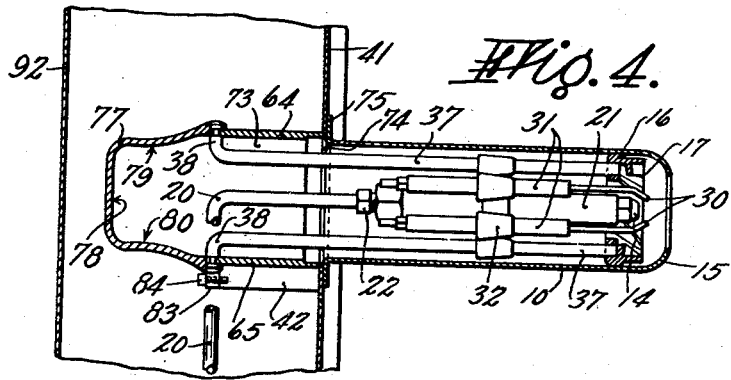
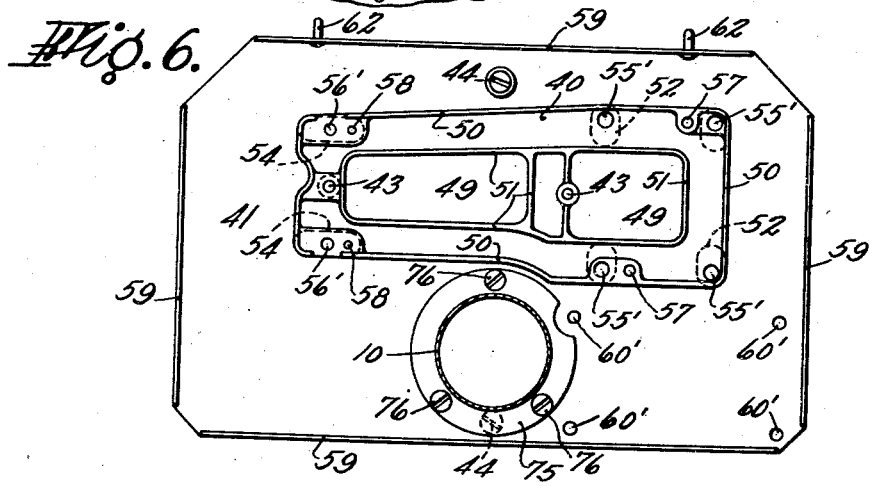
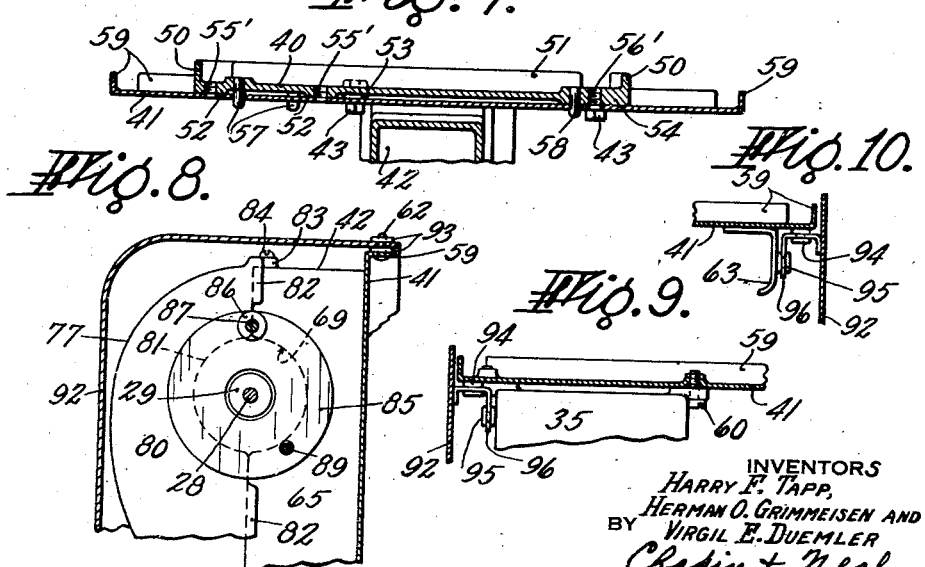
INVENTORS
*HARRY F. TAPP,*
*HERMAN O. GRIMMEISEN* AND
BY *VIRGIL E. DUEMLER*
ATTORNEYS Patented Dec. 31, 1940

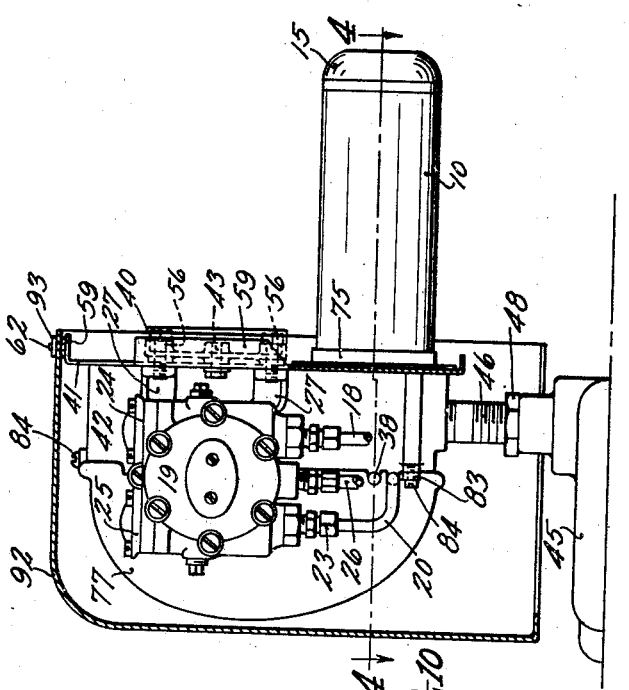

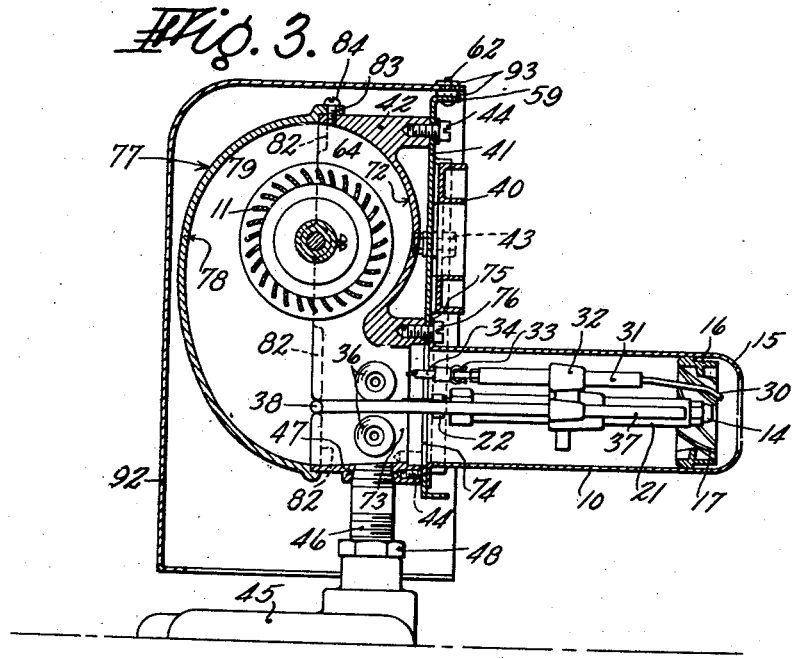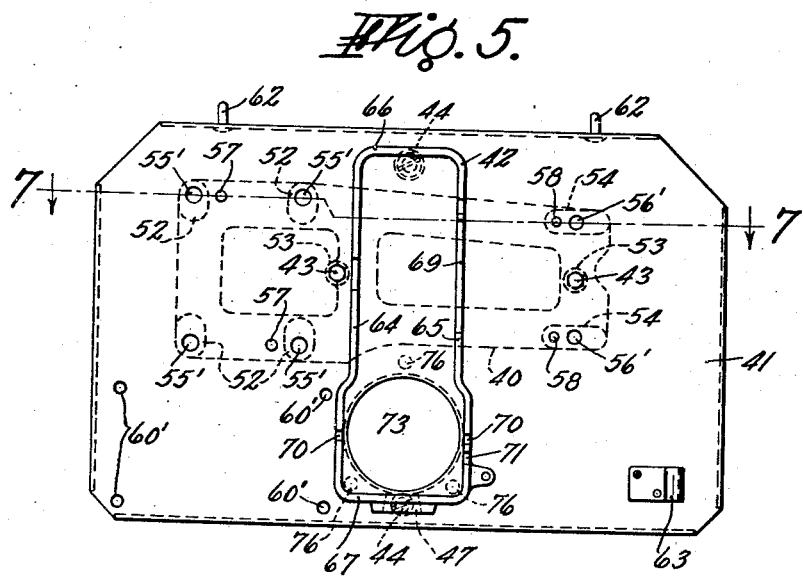

2,227,286

UNITED STATES PATENT OFFICE 2,227,286

LIQUID FUEL BURNER

Harry F. Tapp, Longmeadow, and Herman O. Grimmeisen and Virgil E. Duemler, West Springfield, Mass., assignors to Gilbert & Barker Manufacturing Company, West Springfield, Mass., a corporation of Massachusetts Application May 11, 1939, Serial No. 273,026

1 Claim. (Cl. 158—76)

This invention relates to burners of liquid fuel, such for example as the so-called "gun type" oil burner, and has for its object to improve and simplify the construction, reduce the cost of manufacture and also the cost of servicing the burner by rendering the burner parts quickly and conveniently and completely accessible for the purpose of cleaning, oiling, repair and adjustment.

These and other objects of the invention will best be understood as the detailed description proceeds, while the scope of the invention will be more particularly pointed out in the appended claim.

The invention will be disclosed with reference to the accompanying drawings, in which:

Fig. 1 is a side elevational view of the burner, the housing being shown in section to reveal interior parts;

Fig. 2 is a rear view of the burner, with the housing shown in section and the cover of the fan housing removed, illustrating how convenient access may be had to all burner parts;

Fig. 3 is a sectional elevational view taken on the line 3—3 of Fig. 2;

Fig. 4 is a sectional plan view taken on the line 4—4 of Fig. 1;

Fig. 5 is a front view of the composite frame unit for supporting the burner parts;

Fig. 6 is a rear view of said unit;

Fig. 7 is a sectional plan view taken on the line 7—7 of Fig. 5;

Fig. 8 is a fragmentary sectional plan view taken on the line 8—8 of Fig. 2; and Figs. 9 and 10 are fragmentary sectional plan views taken on the lines 9—9 and 10—10, respectively of Fig. 2.

Referring to these drawings; the invention has been shown by way of illustrative example, as embodied in an oil burner of the mechanical or pressure-atomizing type. The burner includes a horizontally-extending air tube 10 (Fig. 3) made up from sheet metal and in cylindrical form. Air at relatively low pressure is supplied to one end of this tube by means of a fan 11, driven by an electric motor 12 (Fig. 2), to the armature shaft 13 of which it is suitably fixed. Air issues from the other end of the tube to mix with a hollow conical spray of finely-divided oil which issues from the pressure-atomizing nozzle 14. A cap 15 on the outlet end of tube 10 directs the air sream to the oil spray. Mounted in and slidably engaged with tube 10 near the outlet end thereof is a head 16 which may, as shown, have spiral vanes 17 for the purpose of whirling the air just before it meets the oil spray.

Oil is drawn through a suction pipe 18 (Fig. 1) by a pump 19 and forced through a pressure pipe 20 (Figs. 1, 2 and 3) and a nozzle-supporting tube 21 (Figs. 3 and 4) to the nozzle 14. A coupling 22 is provided between pipe 20 and tube 21 and a coupling 23 is provided between this pipe and pump 19. The pump has built into it the usual filter, indicated at 24 (Fig. 1), and the usual pressure-regulating and by-pass valve, indicated at 25, with a return pipe connection 26 for the by-passed oil. The pump is supported by a pair of bracket arms 27 (Fig. 1) with its drive shaft 28 in alinement with shaft 13 and these two shafts are connected by a suitable flexible coupling 29.

Ignition of the oil and air mixture is effected by a pair of spark electrodes 30 (Fig. 4), suitably mounted in insulators 31, located within tube 10 and fixed in a bracket 32 in which the nozzle support 21 is also fixed. The forward ends of electrodes 30 extend into a position adjacent the oil spray emitted from nozzle 14. The rear ends of the electrodes are connected by quick-detachable connections (one of which is shown at 33 in Fig. 3) to wires 34 which extend rearwardly in the air tube for quick-detachable connection in a similar manner to the high tension terminals of a transformer 35 (Fig. 2)—such terminals being located, one in each, inside two insulators 36 fixed to the transformer.

The head 16 and the bracket 32 are fixed to and interconnected by a pair of horizontal rods 37 (Fig. 4) which extend rearwardly through the air tube 10 and terminate with right-angularly bent ends 38, turned outwardly in opposite directions. By pulling on these rods 37, the head 16 and bracket 32 with the electrodes 30, nozzle 14, and nozzle support 21 may be drawn rearwardly out of the air tube 10. To do this, it is only necessary, first, to detach the wires 34 from the high tension terminals of the transformer, second, to detach the oil pipe 20 by unscrewing the coupling 23.

The bracket 32 has a body of generally circular form, as will be seen from Fig. 2, and this body serves as a deflector to force air, flowing through tube 10, outwardly into the path of the whirler vanes 17.

The burner structure, above described is mounted on a supporting frame of novel construction with the motor, fan, pump and transformer contained within a housing formed in part by said frame and in part by a cooperating hood, which is connected in a manner to permit quick attachment to or detachment from the frame.

Referring more particularly to Figs. 5, 6, and 7, the supporting frame is composed of three principal parts, viz.,—a plate 40, a panel 41, and a hollow housing member 42. The members 40 and 42 may be of cast iron and, in any case, they are heavy enough to afford the necessary rigidity. Each member is of roughly rectangular form but the long dimension of member 40 is disposed horizontally while the long dimension of member 42 is disposed vertically,—the two members crossing each other at right angles as shown. The panel 41 is made of heavy gauge sheet metal and interposed between the members 40 and 42, being substantially rectangular in shape and long enough to overlap all of the member 40 and high enough to overlap all of the member 42. A pair of cap screws 43 secure the panel to the member 40 and another pair of screws 44 secure the panel to the member 42. The joined members 40, 41 and 42 afford a rigid frame for supporting the aforesaid elements. This frame is supported in a vertical plane by any suitable means and, in this instance, by a pedestal comprising a base piece 45 and a column 46, which is threaded into the base piece 45 and into the opening 47 in the bottom wall of member 42. The column is adjustable for height and is held in its various positions of adjustment by a lock nut 48.

The frame member 40 is cast in the form best shown in Figs. 6 and 7. It has a flat face with openings 49 therein and outer and inner marginal flanges 50 and 51, respectively. The member is of relatively light weight and yet of sufficient strength and rigidity to bear the load. The flat face of this member is provided with pads 52, 53 and 54 and these are the only parts of the member which need to be finished. The panel 41 abuts these finished pads. The pads 53 have threaded holes to receive the screws 43. The pads 52 have similar openings 55' to receive cap screws 55 by which the motor is clamped against the panel 41 and the latter against the pads. The pads 54 are drilled at 56' to receive cap screws 56, which pass through panel 41 and thread into the pump bracket 27 to clamp the latter against the panel and the panel against pads 54. Fixed in the member 40 are a pair of dowel pins 57 which engage with a close fit in corresponding holes in motor 12 to locate the latter accurately in position. Similar dowel pins 58 are provided for accurately positioning the pump 19 with its shaft 28 accurately alined with motor shaft 13.

The panel 41 except for the clipped off corners is rectangular in shape and provided with outturned stiffening flanges 59, one along each edge. It is drilled with suitable holes properly located to receive the various screws and dowel pins described and, in addition, is provided with tapped holes 60' to receive four cap screws 60 by which the transformer 35 is clamped thereto. Fixed to and upstanding from the upper horizontal flange 59 in longitudinally-spaced relation are two pins 62. Fixed to the face of the panel 41 near the right hand lower corner thereof is a spring clip 63. These pins and the clip cooperate with the housing hood later to be described.

The member 42 forms one member of a housing for fan 11. It is a hollow, box-like casting open at its outer end and has side walls 64 and 65 (a top wall 66 and a bottom wall 67. The outer edges of all these walls lie in the same plane and in a vertical plane, which passes through the alined axes of shafts 13 and 28 and parallels the panel 41. The side wall 64 has a semi-circular recess large enough to freely receive and clear shaft 13 and the side wall 65 has a large semi-circular recess 69 (Fig. 8) which forms part of the air inlet for the fan housing. The side wall 64 is perforated to receive the insulators 36 of the transformer. Both side walls are notched at 70 to receive the outturned ends 38 of pull rods 37. Preferably, the horizontal center line of these notches 70 lies slightly below the horizontal plane which passes through the center line of air tube 10. By so doing, the ends 38 of rods 37 must be sprung downwardly to enter the notches and the ends 38 become frictionally held in the notches, thus retaining them in place until the cover, later to be described, is applied. The side wall 65 also has a notch 71 to receive oil pipe 20. Interiorly, the hollow member 42 has a surface 72 curved to cooperate with the fan rotor and a cylindrical air outlet opening 73, passing through its back wall near bottom wall 67 and located with its axis at right angles to the face of panel 41, which has a registering opening 74 (Fig. 3). The air tube 10 has a flange 75 which abuts the rear face of panel 41 and is secured in place, with its axis alined with the axis of outlet 73, by screws 76 which pass freely through the flange 75 and panel 41 and thread into member 42. The latter needs to be machined on those surfaces which abut panel 41, but requires no other machine work except the drilling and tapping of a few holes.

To complete the fan housing a cast cover member 77 is provided. This member is a hollow box-like casting having a curved wall 78 formed to cooperate with fan 11 and two side walls 79 and 80 to aline with the side walls 64 and 65, respectively, of housing 42. The edges of these side walls 79 and 80 and the end edges of curved wall 78 lie in the same vertical planes as, and about the outer edges of the side walls 64 and 65 and end walls 66 and 67, respectively, of member 42. The side wall 79 is recessed to freely receive and clear shaft 13. Side wall 80 has a large semi-circular recess 81 (Fig. 8) to mate with recess 69 and form therewith a complete circular air-inlet opening. The cover has lips 82 which overlap the side walls and the top and bottom walls of member 42. On these lips are two lugs 83 and screws 84, passing through these lugs, thread into the member 42 and secure the cover in position. These lips likewise have notches to cooperate with the notches 70 and the notch 71 for the purpose of tightly holding the ends 38 of pull rods 37 and the oil pipe 20 in place, as will be clear from Figs. 1 and 3. These notches 70 and 71 are preferably equal in depth to the diameter of the outturned ends 38 and the oil pipe, respectively.

The air inlet opening to the fan housing has a controlling damper 85 (Figs. 2 and 8) centrally perforated to freely receive the shaft coupling 29 and having near its periphery a nut 86 fixed thereto. A screw 87 which passes freely through a lug 88 on the pump 19, is engaged with the nut and, when turned will move the damper axially toward or away from the inlet opening. The damper is also perforated to slidably engage a guide rod 89 fixed at one end to the casing of pump 19. The other end of this pin and of the screw 87 may be engaged in openings in the fan housing to steady them. A spring 90 acts between a washer 91 on screw 87 and one face of the lug 88 to keep the head of the screw engaged with the opposite face of lug 88 and restrain it against axial movement. This spring also yieldingly holds the screw against rotation and thus retains it and the damper in its various positions of adjustment.

Cooperating with the panel 41 to form a housing for the motor, pump, fan and transformer is a hood 92, having a top, a front and two side walls but no bottom or back wall. The hood may be made of pressed metal. In its top wall are fixed two rubber grommets 93 (Fig. 2). The upstanding pins 62 on the top flange 59 of panel 41 pass through the holes in the grommets and the lower faces of the grommets rest on said flange, providing a cushion support for the hood and preventing transmission of vibration from the moving parts of the burner to the hood. Cooperating with these grommets to provide a silent mounting of the hood are other rubber grommets 94 and 95. These are mounted in brackets 96 fixed one to each side wall of the hood near the lower rear corner thereof. Each bracket 96 (Figs. 9 and 10) has a part paralleling the panel 41 and in this part a grommet 94 is fixed, the inner face thereof abutting the adjacent face of the panel. Each bracket also has a part turned outwardly from the end of the first-named part to lie in spaced parallel relation with the adjacent side wall. In this second part of each bracket, a grommet 95 is fixed. One grommet 95 engages the left hand vertical side wall of transformer 35 and the other engages the right hand face of the spring clip 63 fixed on the panel. The hood thus is supported from panel 41 by cushions comprising the grommets 93 and 94, the weight of the hood pressing these grommets against the top flange 59 and the inner face, respectively, of the panel. The grommets 95 are so located as to be engaged and compressed slightly when engaged by the clip 63 and transformer wall described and therefore the hood is prevented from displacement in a horizontal direction paralleling the panel. There is no metal to metal contact between the hood and the frame which supports it or the burner parts within the housing formed jointly by the hood and panel.

The operation of the burner is the same as in all burners of this class and, since the invention is directed to structural details, related to the mounting of the burner parts instead of the functioning of such parts, a detailed description of the operation is thought unnecessary to an understanding of the invention.

The invention offers a composite frame unit, on which all parts of the burner are mounted in a manner to enable convenient and complete access thereto, when the housing hood 92 and the cover 77 of the fan housing are removed. The hood can be quickly removed by simply lifting it off its pins 62 and the cover 77 can be easily removed after two screws 84 are removed. The burner then appears substantially as shown in Fig. 2. Access is then available to the pump 19, valve 25, filter 24, air damper 85, motor 12, transformer 35, and to the interior of the fan housing. Then, by disconnecting the electrode wires 34 and the oil pipe 20 (at the coupling 23), one may draw out of the air tube 10 (by pulling on rods 37) an assembly comprising the air head 16, oil nozzle 14 and its support 21, and the electrodes 30 with their insulators 31. All parts of this assembly are tied together into the form of a single unit. When this unit is withdrawn, all parts thereof remain in the same cooperative relationship which they occupied when the unit was within the tube. The nozzle 14 and electrodes 30 may be cleaned and adjusted in proper working relation and then the unit reinserted in tube 10. This unit will be properly located in the tube when the outturned ends 38 of rods 37 are engaged in notches 70. After inspection, cleaning and adjustment has been completed, one simply screws cover 77 in place and puts the hood in the position shown. It will be appreciated that servicing of the burner is not only made easy and convenient but it may be effected quickly as well. The construction thus enables cost savings in the servicing of the burner.

The composite frame unit also enables substantial cost savings to be effected in the manufacture of the burner. The component parts of this unit are simple and inexpensive to manufacture. The parts 40 and 42 are castings which require finishing only in the few small areas (the pads 52, 53 and 54) which engage the panel 41. The panel is readily made up from sheet metal at low cost. The only other operations required are the drilling of a few holes and the tapping of some of these holes. With these operations performed, the component parts are quickly and easily assembled. One fastens the panel 41 to the member 40 by applying the two cap screws 43 and then fastens the housing 42 to the panel by applying the two cap screws 44. The frame structure is then complete except for the pedestal 45, the column of which screws into the bottom wall 67 of frame member 42. The motor 12 with the fan rotor 11 already fixed to the armature shaft 13, is put in place. The motor is accurately located on the frame by means of its dowel pins 57 and is rigidly held in place by the four cap screws 55. The rotor 11 readily slips into the open end of housing 42 and the shaft 13 into the recesses provided to receive it in the housing. The pump 19 is located by its dowels 58 and rigidly fastened to the frame by its cap screws 56. The coupling 29 and air damper 85 are then applied. The air tube 10 is secured to housing 42 by the screws 76. The unit shown in Fig. 4, having been previously assembled is slid into tube 10 from the rear end thereof and located in position by the engagement of the parts 38 in notches 70. The transformer 35 is bolted to panel 41 with the insulators 36 entering holes in the side wall 64 of housing 42. The electrode wires 34 are connected to these insulators and the cover 77 is put in place and fastened with the two screws 84. The oil pipe 20 is connected to the pump 19 by the coupling 23 to complete the assembly after which the hood 92 is slipped in place on the frame to enclose the parts.

The frame unit is characterized also by an efficient utilization of metal affording great strength where needed and avoiding unnecessary weight in other locations. Thus, member 40 which carries the motor, pump and fan, is relatively strong and rigid because the moving parts of the elements it supports must be held rigidly in accurate alinement. The member 42 simply bears the weight of the burner and acts as a housing for the fan and a support for air tube 10. It is made adequate in strength for this purpose, without being unduly heavy. The panel 41 which needs to be of large area to provide a back wall for the housing, is made light by utilizing sheet metal but it nevertheless has adequate strength for its purpose as a connector between the members 40 and 42 and as a support for the tranformer. Thus, a sufficiently strong frame is provided and an economical utilization and distribution of metal of the frame is secured. The frame may be made in quantities at low unit cost and offers the advantages of quick and easy assembly of the burner parts.

Obviously, the frame unit described may be supported in any desired way and the invention is not dependent on the use of the pedestal 45 as any other suitable means may be used for the purpose of supporting the frame unit, either through the member 42 or otherwise.

What we claim is:

1. In an oil burner, a fan including a casing having a tubular outlet conduit, an air-directing head slidably mounted in said conduit and normally located in a predetermined position near the outlet end of said conduit, an oil-atomizing nozzle mounted coaxially of the conduit near the outlet end thereof, a support for said nozzle, a flexible supply pipe for oil entering said conduit and connected to said nozzle, said support and head being interconnected and having a pair of rod extensions which pass rearwardly in a longitudinal direction one on each side of the axis of said conduit and pass into said casing, the latter having relatively fixed and removable parts which when separated allow removal of said head and support by means of said rod extensions, said fixed part having notches in the plane of parting of said parts and said notches being closed by the other part when in place, the rod extensions having right angularly turned terminal portions extending laterally in opposite directions into said notches to definitely locate said support and head in the desired predetermined longitudinal positions in said conduit.

HARRY F. TAPP.
HERMAN O. GRIMMEISEN.
VIRGIL E. DUEMLER.